Patented Mar. 1, 1927.

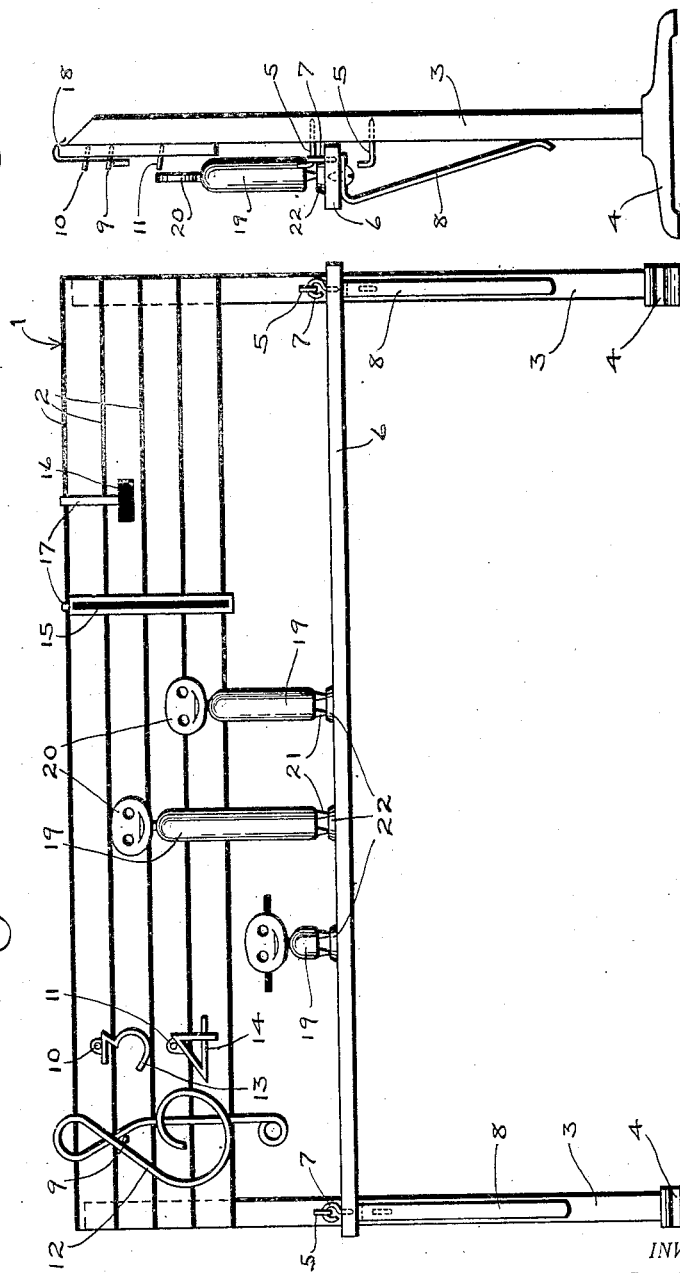

1,619,683

UNITED STATES PATENT OFFICE.

ALEXANDER J. STINSON, OF ELGIN, ARIZONA.

MUSIC-TEACHING DEVICE.

Application filed June 26, 1926. Serial No. 118,815.

This invention relates to educational devices and pertains particularly to a method and means for teaching the elementary principles of music and is designed primarily for the teaching of music to children.

The primary object of this invention is the provision, in a manner as hereinafter set forth, of a device for teaching music, which may be set up before the pupil and have applied thereto the various characters or symbols employed in music, in any desired arrangement.

Another object of the invention is the provision, in a manner as hereinafter set forth, of a device for teaching music, in which the notes may be placed in any desired position or arrangement and having means whereby all of the notes, after arrangement in the desired manner, can be raised or lowered before the staff to indicate the use of the treble clef and the bass clef.

Still another object of the invention is the provision, in a manner as hereinafter set forth, of a music teaching means in which the note characters are formed in such manner as to appeal to the minds of children to cause them to take a greater interest in the study of the subject.

The invention will be best understood from a consideration of the following detailed description taken in connection with the accompanying drawing forming a part of this specification, with the understanding that the invention is not confined to any strict conformity with the showing of the drawing but may be changed and modified so long as such changes and modifications mark no material departure from the salient features of the invention as expressed in the appended claims.

In the drawing:—

Figure 1 shows in front elevation the structure embodying this invention and,

Figure 2 shows the same structure in end elevation.

Referring now to the drawing in detail wherein like numerals of reference indicate corresponding parts throughout the several views, the numeral 1 indicates a staff which may be in the form of a solid elongated member and has the bars 2 thereof formed longitudinally of the face.

The staff may be supported upon suitable upright members 3 each having its lower end secured in a base 4 for the proper support of the structure.

Secured in the face of each of the supporting upright members 3 is a pair of hook members 5 arranged in spaced superposed relation, and suspended from these hooks at an appropriate distance below the staff 1, is a platform 6 in each end of which there is fixed an eye 7 which engages over one of the hooks 5. As shown in Figure 1 the platform 6 extends the full length of the staff and is supported therebeneath in the manner described. An angled bracket member 8 is secured at each end of the platform 6 and each of these bracket members which are substantially L-shaped, has the short leg thereof secured to the underside of the platform while the free end of the long leg thereof bears against the face of the adjacent standard 3 to support the platform in the manner shown. It will be readily seen that the platform can be disengaged from the hook from which it is hung by swinging the brace members 8 outwardly and lifting the eyes 7 from the hooks.

At one end of the staff 1 there are placed pins or peg members 9, 10, and 11, the pegs 10 and 11 being in superposed relation. Upon the peg 9 which is nearest the end of the staff, a clef 12, formed from wood, pasteboard or other appropriate material, may be hung and upon the pegs 10 and 11 there may be hung the numerals 13 and 14 to indicate time signature. As shown these numerals are provided with apertured ears which are designed to engage over the pegs and by this means three-four time may be changed to two-four, or four-four time by simply removing the numeral 3 and substituting the numeral 2 or the numeral 4 as desired. It is of course understood that a complete assortment of these cutout numerals may be kept on hand so that they may be placed upon or removed from the pegs at will for the purpose of indicating time.

All of the symbols incidental to the musical art, may be provided with means for locating the various symbols in their respective positions upon the staff. While only a few of these symbols have been shown it is to be understood that applicant does not limit himself to the ones shown in the drawing but may have all of the symbols provided with means for attaching them to the staff, as above explained. Symbols such as bars and rests as indicated by the numerals 15 and 16, may be provided with the supporting straps 17 looped at their upper ends as indicated at 18 for engagement over the top edge of the staff in the manner shown, for the proper placing of the same.

For the purpose of making the study of music more appealing to children, the notes used in conjunction with this music teaching method, are provided in the form of little men or other figures, as indicated by the numerals 19. These figures have bodies of varying lengths, and the heads 20 thereof symbolize the notes. In order to indicate 8th, 16th, 32nd and 64th notes, figures therefor may in any manner be distinguishable from other figures. Whole notes and half notes may be provided with suspension means such as that provided for the rest 16. The men 19 may be provided with the feet 21 which are mounted upon the bases 22. These bases are adapted to set upon the platform 6 and by selecting the men of proper height the notes 20 can be brought to the proper position before the staff.

In order to illustrate the use of the treble and bass clefs the platform 6 can be raised or lowered to support it upon the upper or lower hooks 5 thus raising or lowering the note men before the staff, the clef upon the peg being changed accordingly.

While the hook members 5 have been here shown in the form of screw hooks it is of course to be understood that applicant does not wish to limit himself to this manner of supporting the platform 6, for the hooks may be extended thru slots in the posts or uprights 3 and adjustably held by thumb screws or other appropriate means.

From the foregoing description it will be readily seen that a music teaching outfit of the character herein described would be particularly appealing to children causing them to take greater interest in the study of music and assisting them in remembering the subject.

Having thus described my invention what I claim is:—

1. A music instruction device comprising a staff, means for supporting the same in horizontal position, means for removably fixing certain music symbols upon said staff, a platform extending beneath said staff, and a plurality of figure members of varying heights having heads symbolizing music notes, said members being designed to stand on said platform to position the heads thereof in desired sequence, before said staff.

2. A music instruction device comprising a staff, means for supporting the same in horizontal position, means for removably fixing certain music symbols upon said staff, a platform extending beneath said staff, a plurality of figure members of varying heights having heads symbolizing music notes, said members being designed to stand on said platform to position the heads thereof in desired sequence, before said staff, and means whereby said platform may be adjusted vertically to shift the note heads of the figures carried thereon, to illustrate the use of a treble or bass clef.

In testimony whereof, I affix my signature hereto.

ALEXANDER J. STINSON.